March 10, 1953 — A. F. KAULAKIS — 2,631,123
PROCESS AND APPARATUS FOR HYDRATING CRACKING CATALYST
Filed April 9, 1949
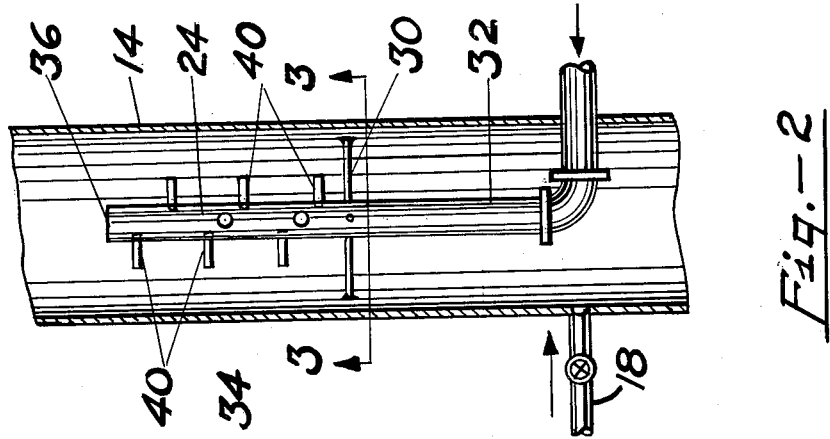
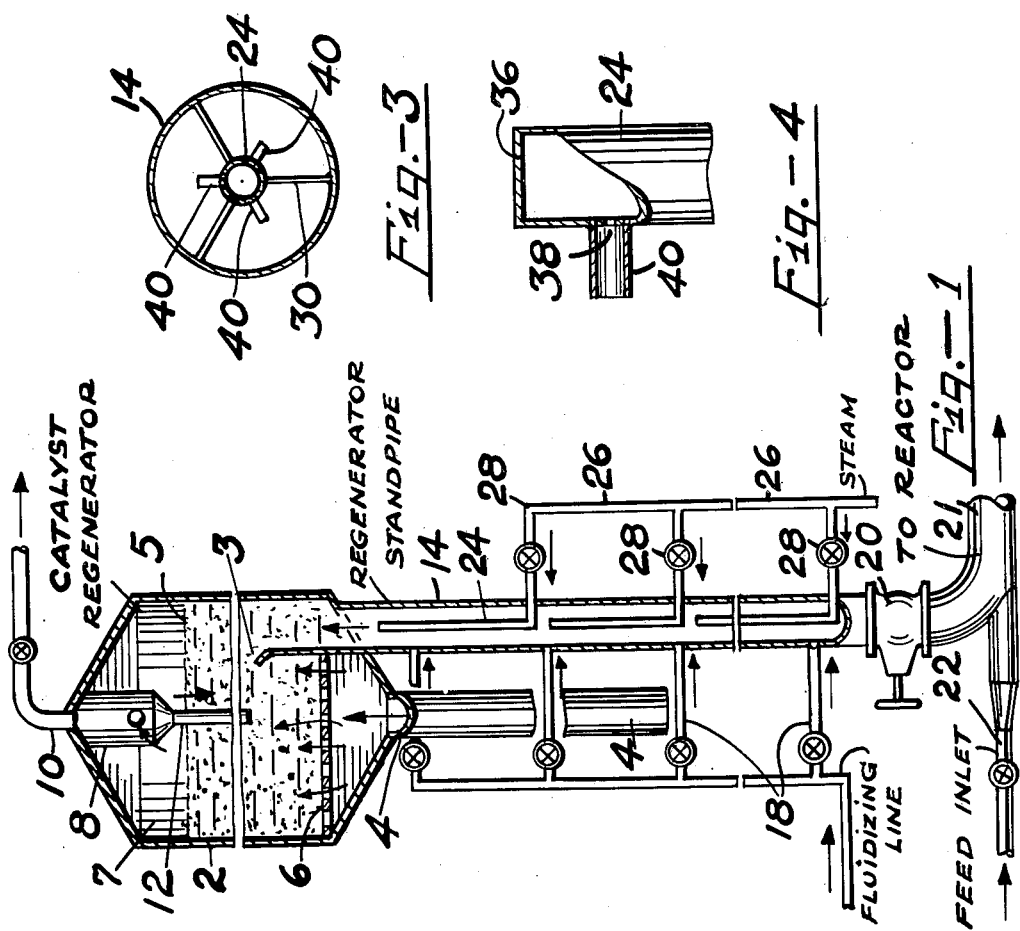
Arnold F. Kaulakis, Inventor
By George J. Silhavy, Attorney Patented Mar. 10, 1953

2,631,123

UNITED STATES PATENT OFFICE 2,631,123

PROCESS AND APPARATUS FOR HYDRATING CRACKING CATALYST

Arnold F. Kaulakis, Chatham, N. J., assignor to Standard Oil Development Company, a corporation of Delaware Application April 9, 1949, Serial No. 86,529

9 Claims. (Cl. 196—52)

This invention relates to the catalytic conversion or treatment of hydrocarbons and more particularly to the hydration of natural clays used in catalytic treating techniques.

The use of the natural earth bentonitic type clays for catalyzing hydrocarbon conversion reactions is known. Of these bentonitic clays probably the best known and most widely used are the montmorillonitic type clays which are acid activated and marketed under the trade name of "Filtrol." These montmorillonitic type clays have been found efficacious in promoting various types of hydrocarbon conversion reactions, among which are catalytic cracking, polymerization, dehydro-halogenation, dehydration, alkylation, hydrogenation, isomerization and toluene production.

The montmorillonitic clays used in the conversion of hydrocarbons may be represented by the ideal molecular formula $Al_2Si_4O_{10}(OH)_2 \cdot nH_2O$ in which the $n$-molecules of water are held within the lattice structure which the molecule assumes. These $n$-molecules of water are known as water of hydration. The ideal formula is seldom experienced in nature, however, due mainly to substitution. One substitution that seems to be typical is the partial replacement of aluminum by magnesium.

Upon activation of montmorillonitic type clays, which is usually accomplished by an acid treatment, the constituency of the clay changes. This activation serves two purposes: (a) removal of impurities with attended increase in effective catalytic surface and (b) replacement of the exchangeable ions by hydrogen.

When these activated montmorillonitic type clays are used as catalysts in the catalytic treatment of hydrocarbons and particularly when they are used as catalysts in catalytic cracking processes, they are subjected to temperatures ranging from 800° F. to 1150° F. At temperatures within these ranges the catalysts become dehydrated, that is, some of the water molecules present in the crystalline lattice structure are removed and the catalyst loses activity with a corresponding decrease in desired conversion products. This loss of activity is especially pronounced when the hydrocarbon stream contains appreciable quantities of sulfur or sulfur compounds, these compounds acting as catalyst poisons. Dehydration of the catalyst also occurs during regeneration of the catalyst.

This lost water of hydration must be replaced at some point in the process to restore catalyst activity and in the present invention is accomplished by treating the catalyst with steam. In addition to replacing the water of hydration, steam treating removes the catalyst poisons accumulated upon the catalyst surfaces and aids in restoring the catalyst to its original activity.

Successful operation in fluid plants which utilize the activated montmorillonitic type clays as cracking catalysts is contingent upon supplying the water needed to rehydrate the catalyst after regeneration simply and adequately and without upsetting the operational balance. Although this rehydration may be carried out in a separate hydration vessel which is placed in the plant between the zone of regeneration of the catalyst and the point of contact between the catalyst and feed, in existing plants a separate hydration vessel or zone cannot be readily provided because of design considerations. The most practical zone available to accomplish this hydration before the catalyst contacts fresh feed is the regenerator standpipe. Even in new plants rehydration of dehydrated catalyst in the regenerator standpipe represents the most economical procedure due to the simplicity of the apparatus required.

The quantity of steam required to hydrate catalyst such as the montmorillonitic type clays is quite large, the amount of hydration taking place being in the range of 0.5 to 1.0 wt. percent based on catalyst which in terms of typical commercial plant operations amounts to 18,000 to 36,000 pounds of steam per hour. The hydration proceeds at a variable rate depending on the degree to which the catalyst has been dehydrated and the degree to which the catalyst has been hydrated in a prior zone.

Attempts to carry out the hydration in plant standpipes using existing aeration taps have failed, serious disruptions in flow of catalyst in the standpipes occurring. These disruptions were apparently due to the following two factors:

First, the large quantities of steam injected into the relatively small standpipe and in concentrated areas tended to hold up or block downward flow of catalysts; and Second, subsequent shrinkage of gas volume in the standpipe at a rapid rate due to disappearance of steam to hydration resulted in bridging and a consequent stoppage of flow.

This invention has as its principal object the provision of an apparatus and process to accomplish the hydration of dehydrated catalysts.

A further object of the invention is to provide an apparatus and process for hydrating dehydrated catalytic material in standpipes without the disadvantages of disrupting the flow of catalyst therein.

Basically the invention comprises supplying the large quantities of steam needed for catalyst hydration to individual sections of the standpipe in controlled amounts depending on how fast hydration proceeds in the various sections such that flow of the catalyst will not be interrupted or disturbed. Thus, for example, larger quantities of steam can be added at the top of the standpipe when the catalyst is essentially totally dehydrated and progressively less steam can be added to the lower sections of the standpipe where requirements are somewhat lower since portions of the catalyst have already been hydrated. The quantity of steam added to each section will be determined from experience, but the general principle involved would be to supply to each section just enough steam for the hydration that will take place in that section plus a quantity that will normally be required for aeration.

The invention will be better understood by referring to the accompanying drawing wherein:

Fig. 1 represents a diagrammatic view partly in cross-section of a catalyst regenerator of the fluid type equipped with a downcomer or standpipe.

Fig. 2 represents an enlarged cross-section of a portion of the catalyst regenerator standpipe showing a steam distributing element;

Fig. 3 represents a vertical cross-section of the catalyst regenerator standpipe taken along the line 3—3 of Fig. 2 and looking in the direction of the arrows; and Fig. 4 represents an enlarged view partly in cross-section of the upper extremity of the steam distributing element shown in Fig. 2.

Referring now to Fig. 1 reference character 2 designates a regenerator vessel of the type adapted to regenerate spent catalytic cracking catalyst in a fluid process. Spent cracking catalyst such as acid activated bentonite which has lost water of hydration is withdrawn from a reaction vessel, not shown, admixed with air or other oxidizing gas and introduced into catalyst regenerator 2 through line 4. The lower part of catalyst regenerator vessel 2 is equipped with a perforated plate or distributing plate 6 for distributing the mixture of catalyst and oxidizing medium such as air equally across the area of the vessel. The velocity of the oxidizing medium entering the regenerator vessel 2 is so selected that the catalyst particles are maintained as a fluidized bed 3 having a definite level as shown at 5. Superficial velocities within a range of from about 0.5 to 3.0 ft. per sec. are operable and velocities between about 1.0 and 1.5 feet per sec. are preferred. The fluidized bed has many of the characteristics of a liquid and will have a density in the range of 10 to 40 pounds per cu. ft. depending upon the catalyst and the condition of the operation. Above the level 5 of the fluid bed of catalyst 3 in the regenerator vessel 2 there will be a less dense phase 7 which will have a density of between 0.002 and 0.10 pound or higher per cu. ft. also depending upon the catalyst and the conditions on the zone.

The temperature within regenerator vessel 2 is maintained at one within a range of from 1000° F. to 1200° F., preferably at 1100° F. At this temperature the carbonaceous deposits upon the surface of the catalyst particles are burned off, the oxygen being supplied by the air or other oxidizing gas admitted through line 4. The heat liberated by the combustion is utilized to maintain the temperature of the bed at the desired level.

After the desired residence time during which the carbon deposits on the surface of the catalyst have been removed, the catalyst particles are withdrawn directly from the dense bed of regenerator vessel 2 by means of a regenerative standpipe hereinafter to be described. The spent combustion gases from regenerator vessel 2 pass upwardly through the less dense phase 7 at the top of the regenerator vessel and enter cyclone separator 8. Here the spent combustion gases are separated from any entrained catalyst particles and the gases are vented through line 10. The catalyst particles which are separated from the gases are collected by the cyclone separator 8 and deposited beneath the surface of the dense bed 3 by means of dip pipe 12.

Regenerated catalyst is withdrawn directly from the dense bed of catalyst 3 in catalyst regenerator 2 by means of regenerator standpipe 14. Standpipe 14 is equipped with fluidizing lines 18 through which the desired amounts of the fluidizing medium such as steam, flue gas or other inert gas is admitted into the regenerator standpipe to maintain the catalyst in a dense fluidized condition.

Regenerator standpipe 14 is equipped with a slide valve 20 which permits the withdrawal of the desired amounts of the regenerated catalyst. A hydrocarbon feed such as a gas oil boiling in the 600–1000° F. range is admitted to line 21 below valve 20 through line 22. This hydrocarbon feed is vaporized by the hot regenerated catalyst from regenerator standpipe 14 and the mixture of catalyst and vapors is transported from the regenerator standpipe to a reaction vessel not shown. Instead of using liquid hydrocarbon feed, vaporized hydrocarbon feed may be used.

Due to the temperatures of operation within the dense bed of catalyst regenerator 2, the catalyst gives up some of its water of hydration. With the decrease in the water content of the cracking catalyst, catalyst selectivity and activity decline particularly when processing sulfur-containing stocks; this in turn results in a less desirable product distribution in the cracking operation. This lost water of hydration must be replaced in order to restore catalyst activity and/or to prevent selectivity decline and must occur in such fashion so as not to upset the operational balance of the process.

This is accomplished in the present invention by the injection of steam into the catalyst regenerator standpipe 14 by means of distributing elements 24 and lines 26. This steam is injected into the catalyst in the standpipe 14 in addition to the aeration gas introduced into the catalyst through lines 18. Lines 26 are equipped with valves 28 which permit accurate control of the amount of steam entering different zones of the regenerator standpipe 14.

The amounts of steam required in the different zones of the standpipe will depend, of course, upon operational factors such as temperature, kind of catalyst, rate of circulation of catalyst, etc. and upon the rate of catalyst hydration. The operational factor being constant, the rate of catalyst hydration varies, it being rapid initially and slower as the saturation point is approached.

A sample of acid activated bentonite was steamed at a pressure of one atmosphere and gave the following results:

| Time of Steaming, minutes | Wt. Percent Water of Hydration |
|---|---|
| 1.25 | 1.6 |
| 1.33 | 1.7 |
| 8.70 | 1.8 |
| 120.00 | 2.0 |

The total amount of steam entering standpipe 14 through distributing elements 24 and lines 26 may perform two functions: it will rehydrate the catalyst in the standpipe and may also assist in maintaining it in a fluidized state. In plants circulating about 30 tons of catalyst per minute, about 2000 lbs. of steam per hour will be required for aeration, while about 18,000 lbs. of steam per hour will be required for hydration of the catalyst when hydration occurs to the extent of 0.5 weight per cent on the catalyst. The steam for fluidizing or aerating the catalyst in the standpipe may be introduced through fluidizing lines 18 or if it is desired, another fluidizing gas such as combustion gas may be utilized for fluidization.

Referring now to Fig. 2 a more detailed drawing of one of the distributing elements 24 is shown. The element is formed from a hollow tube or pipe member which is bent to an angle of 90°. The element is positioned centrally within standpipe 14 and is held in position by suitable securing means such as spider brace 30. It is also within the scope of this invention to have the distributing elements 24 pointing down in standpipe 14 instead of up as shown in the drawing. The preferred embodiment, however, is as shown in the drawing.

The element 24 may be considered as being in two sections, the lower section 32 being a preheating section and the upper section 34 constituting a distributing section. The upper end or extremity of distributing element 24 is tapped off or closed as shown at 36 in detail in Fig. 4.

The distributing section of each element 24 is equipped with a number of steam discharge ports or orifices 38 which are arranged around the periphery of the distributing section at different levels and are of a size depending on the quantity of steam to be delivered and the pressure drop to be obtained. The number of orifices in each distributing element will be determined by the pressure drop desired across them and the amount of steam to be distributed throughout the standpipe area. Ordinarily the pressure drop desired will be within a range of from 2–6 lbs. per sq. in. gauge depending, of course, on the conditions of operation. To give a five pound pressure drop where 5,000 lbs. per hour of steam is distributed at 1050° F. through a distributing element, 150–200 orifices ⅛" in diameter are required. Each distributing orifice 38 is protected from erosion by the steam-catalyst mixture by a nipple 40. This feature is repeated, of course, throughout the distributing section.

Steam entering distributing element 24 through line 26 has a temperature of from about 300–400° F. By indirect heat exchange with the hot regenerated catalyst in standpipe 14 which may be at a temperature between 1000 and 1050° F., steam in the lower portion or preheating section 32 of the distributing element is quickly raised to a temperature between 1000 and 1050° F. It then passes into the distributing section of element 24 and is equally distributed throughout the catalyst in the regenerator standpipe 14 through the orifices.

Although the invention is described with reference to a fluid process, it is to be understood that it is equally applicable to a fluid or moving bed type operation in which a catalyst which undergoes hydration and dehydration is used.

What is claimed is:

1. In an apparatus for hydrating a dehydrated solid catalyst mass of small particle size, the improvement which comprises in combination a vessel adapted for contacting gas and catalyst particles, a standpipe having an upper end communicating with a lower part of said vessel and having a valved lower end communicating with a conduit adapted for transporting hydrated catalyst particles to a reactor vessel, the standpipe being provided with a plurality of pipes centrally disposed within the standpipe in vertically spaced relationship and extending throughout substantially the entire length of said standpipe from its valved lower end to its open upper end, each of said pipes being perforated along its length to provide a plurality of fixed orifices therein, the fixed orifices of the uppermost perforated pipe being adapted to deliver steam at relatively the greatest rate of flow and the fixed orifices of consecutive lower perforated pipes being adapted to deliver steam at progressively smaller rates of flow into the standpipe, and a valved steam supply pipe communicating with each of the aforesaid perforated pipes.

2. In an apparatus for converting hydrocarbons by contacting hydrocarbon vapors in a reactor vessel with a dense fluid bed of catalyst and regenerating spent powdered catalyst in a dense fluid phase in a regenerator vessel wherein the catalyst becomes dehydrated, the improvement which comprises in combination a regenerator vessel and a standpipe having an open upper end communicating with a lower part of said regenerator vessel and having a lower end communicating with a conduit which in turn communicates with a reactor vessel, the conduit being provided with a hydrocarbon inlet in the vicinity of its junction with the standpipe, the standpipe being provided with a plurality of steam distributing pipes centrally disposed in the standpipe in vertically spaced relationship and extending substantially throughout the entire length of said standpipe from its lower end to its upper end, each of said pipes having its upper end closed and having perforations distributed at different levels around the periphery to provide a plurality of fixed orifices therein, the fixed orifices of the uppermost steam distributing pipe being adapted to deliver steam at relatively the greatest rate of flow and the fixed orifices of the consecutive lower steam distributing pipes being adapted to deliver steam at progressively lower rates of flow to the standpipe, a valved steam supply manifold communicating with each of said steam distributing pipes, and a plurality of aeration gas inlet pipes communicating with the interior of said standpipe at a plurality of vertically spaced points disposed around the periphery of the standpipe and along substantially the entire length thereof.

3. An apparatus according to claim 2 wherein each of the perforations of the steam distributing pipes is exteriorly fitted with an open nipple.

4. An apparatus according to claim 3 wherein each of the steam distributing pipes has the perforations distributed at different levels around the periphery of its upper section but has no perforations in its lower section.

5. In a process wherein small particles of a hydrated catalyst are continuously circulated between a dense fluid catalyst phase maintained in a high temperature conversion zone and a dense fluid catalyst phase maintained in a high temperature regeneration zone and wherein the catalyst becomes dehydrated by contact with conversion gases, the improvement which comprises downwardly withdrawing a dense aerated essentially vertical elongated column of the dehydrated catalyst particles from the dense phase of the regeneration zone, centrally injecting different amounts of steam into the catalyst column at a plurality of levels vertically spaced throughout the entire height of the catalyst column, the amount of steam injected at each level being substantially equal to the amount of catalyst hydration accomplished at that level and being largest at the uppermost level and smallest at the lowest level, discharging the resulting hydrated catalyst from the bottom of the column into a mixing zone maintained under the hydrostatic pressure exerted by the said aerated catalyst column, mixing the discharged hydrated catalyst with hydrocarbon vapors to form a dispersion of catalyst in the vapors, and moving a stream of the resulting catalyst dispersion from the mixing zone upwardly into the conversion zone.

6. In a fluid process for cracking hydrocarbons wherein a clay catalyst is continuously circulated between a dense fluid catalyst phase maintained in a high temperature conversion zone and a dense fluid catalyst phase maintained in a high temperature regeneration zone, the improvement which comprises continuously withdrawing hot dehydrated catalyst particles as an elongated fluidized dense column downwardly from the dense phase of the regeneration zone, centrally injecting different amounts of steam preheated substantially to the temperature of the hot dehydrated catalyst particles into the catalyst column at a plurality of levels vertically spaced throughout the entire height of the catalyst column and thereby hydrating the catalyst to the extent of 0.5 to 1.0 weight percent, the amount of steam injected at each level being substantially equal to the amount of hydration accomplished at that level and being largest at the uppermost level and smallest at the lowest level, also injecting an additional amount of an inert aerating gas into the catalyst column at vertically spaced points around the periphery of the column to maintain the column in fluidized condition, discharging the hydrated catalyst column into a mixing zone maintained under the hydrostatic pressure exerted by said fluidized catalyst column, mixing the discharged hydrated catalyst with hydrocarbon feed vapors to form a dilute phase of catalyst dispersed in hydrocarbon vapors and moving a stream of the dilute catalyst phase from the mixing zone upwardly into a lower portion of the conversion zone by the effect of the difference in pressures existing in the aforesaid dense catalyst column and the said dilute catalyst phase.

7. A process according to claim 6 wherein the catalyst is an acid-treated clay.

8. In a fluid catalytic cracking process wherein an acid-activated clay catalyst is continuously being circulated between the dense catalyst phases maintained in a cracking zone and a regeneration zone respectively, the improvement which comprises withdrawing dehydrated catalyst particles at a temperature of 1000 to 1200° F. as an elongated dense fluidized column downwardly from the dense phase of the regeneration zone, passing steam at a temperature between 300 and 400° F. through a plurality of preheating zones maintained within the dense catalyst column in indirect heat exchange relation with the hot catalyst particles so as to preheat the steam substantially to the temperature of the catalyst particles, injecting different amounts of preheated steam from the preheating zones into the catalyst column through distribution zones centrally located within said column and vertically spaced throughout the entire height of the said column, each of said distribution zones communicating with one of the preheating zones, the total volume of steam injected being such as to hydrate the catalyst to the extent of 0.5 to 1.0 weight percent, the volume of steam injected through each distribution zone being substantially equal to the amount of catalyst hydration accomplished at that level and being largest at the uppermost distribution zone and being progressively smaller at the consecutively lower distribution zones, and also injecting an additional amount of an inert aeration gas into the catalyst column at a plurality of points distributed around the periphery of the column at vertically spaced levels to maintain the column in fluidized condition, discharging the hydrated catalyst at the bottom of the catalyst column into a mixing zone, and mixing the discharged catalyst with hydrocarbon feed vapors and directly passing the resulting dilute mixture of catalyst and hydrocarbon vapors upwardly into the cracking zone.

9. A process according to claim 8 wherein the inert aeration gas is flue gas.

ARNOLD F. KAULAKIS.

REFERENCES CITED

The following references are of record in the file of this patent:

UNITED STATES PATENTS

| Number | Name | Date |
|---|---|---|
| 2,113,654 | Ipatieff et al. | Apr. 12, 1938 |
| 2,319,185 | Crowley | May 11, 1943 |
| 2,420,049 | Martin | May 6, 1947 |
| 2,445,351 | Gohr | July 20, 1948 |
| 2,457,232 | Henstebeck | Dec. 28, 1948 |
| 2,464,616 | Schwarzenbek et al. | Mar. 15, 1949 |
| 2,490,774 | Bland | Dec. 13, 1949 |
| 2,526,701 | Shirk | Oct. 24, 1950 |
| 2,539,583 | Kuhn | Jan. 30, 1951 |
| 2,543,070 | Shabaker | Feb. 27, 1951 |

OTHER REFERENCES

Davidson: "Cracking Sulfur Stocks with Natural Catalyst," pp. 669–672, Petroleum Refiner, vol. 26, pp. 663–672 specifically.